United States Patent
Matsubayashi et al.

(10) Patent No.: US 10,640,627 B2
(45) Date of Patent: May 5, 2020

(54) METHOD OF PRODUCING AMINE ADDUCT OF CONDUCTIVE COMPOSITE, METHOD OF PRODUCING AMINE ADDUCT LIQUID OF CONDUCTIVE COMPOSITE, AND METHOD OF PRODUCING CONDUCTIVE FILM

(71) Applicants: SHIN-ETSU POLYMER CO., LTD., Tokyo (JP); NISSIN CHEMICAL INDUSTRY CO., LTD, Echizen-shi, Fukui (JP)

(72) Inventors: Sou Matsubayashi, Saitama (JP); Takanori Suzuki, Echizen (JP)

(73) Assignees: SHIN-ETSU POLYMER CO., LTD., Tokyo (JP); NISSIN CHEMICAL INDUSTRY CO., LTD., Echizen-Shi (JP)

( * ) Notice: Subject to any disclaimer, the term of this patent is extended or adjusted under 35 U.S.C. 154(b) by 73 days.

(21) Appl. No.: 15/712,648

(22) Filed: Sep. 22, 2017

(65) Prior Publication Data

US 2018/0094119 A1 Apr. 5, 2018

(30) Foreign Application Priority Data

Sep. 30, 2016 (JP) ................................. 2016-193967

(51) Int. Cl.
| | |
|---|---|
| *C08K 5/17* | (2006.01) |
| *C09D 125/18* | (2006.01) |
| *C09D 4/00* | (2006.01) |
| *C08J 3/03* | (2006.01) |
| *C08G 75/00* | (2006.01) |
| *C08F 112/14* | (2006.01) |
| *C08F 2/10* | (2006.01) |
| *C08F 28/06* | (2006.01) |
| *C08K 5/00* | (2006.01) |

(52) U.S. Cl.
CPC .................. *C08K 5/17* (2013.01); *C08F 2/10* (2013.01); *C08F 28/06* (2013.01); *C08F 112/14* (2013.01); *C08G 75/00* (2013.01); *C08J 3/03* (2013.01); *C09D 4/00* (2013.01); *C09D 125/18* (2013.01); *C08G 2261/1424* (2013.01); *C08G 2261/3223* (2013.01); *C08G 2261/794* (2013.01); *C08J 2365/00* (2013.01); *C08J 2381/00* (2013.01); *C08J 2425/18* (2013.01); *C08K 5/0025* (2013.01); *C08K 2201/001* (2013.01)

(58) Field of Classification Search
CPC ... C08K 5/17; C08F 2/10; C08F 28/06; C08F 112/14; C08G 75/00; C08J 3/03; C09D 125/18; C09D 4/00
See application file for complete search history.

(56) References Cited

U.S. PATENT DOCUMENTS

| | | |
|---|---|---|
| 7,317,048 B2 | 1/2008 | Zhang |
| 2015/0337061 A1* | 11/2015 | Yano ..................... C08F 134/04 427/58 |

FOREIGN PATENT DOCUMENTS

| | | | |
|---|---|---|---|
| CN | 101899197 A | 12/2010 | |
| EP | 2949706 A1 | 12/2015 | |
| JP | 2002-348468 A | 12/2002 | |
| JP | 2008-045061 * | 2/2008 | ............ C08L 101/12 |
| JP | 2011-032382 A | 2/2011 | |
| JP | 2012-201837 A | 10/2012 | |
| TW | 201420670 A | 6/2014 | |
| WO | 2004063277 A1 | 7/2004 | |

OTHER PUBLICATIONS

Machine translation of JP 2008-045061. (Year: 2008).*

* cited by examiner

*Primary Examiner* — John E Uselding
(74) *Attorney, Agent, or Firm* — Lando & Anastasi, LLP

(57) ABSTRACT

Provided is a method of producing an amine adduct of a conductive composite, including: adding an amine compound to a conductive polymer dispersion liquid which contains water and a conductive composite containing a $\pi$ conjugated conductive polymer and a polyanion at a mass ratio of the $\pi$ conjugated conductive polymer to the polyanion of 1:3 to 1:7.5 to precipitate an amine adduct of the conductive composite.

23 Claims, No Drawings

METHOD OF PRODUCING AMINE ADDUCT OF CONDUCTIVE COMPOSITE, METHOD OF PRODUCING AMINE ADDUCT LIQUID OF CONDUCTIVE COMPOSITE, AND METHOD OF PRODUCING CONDUCTIVE FILM

BACKGROUND OF THE INVENTION

Field of the Invention

The present invention relates to a method of producing an amine adduct of a conductive composite that contains a π conjugated conductive polymer, a method of producing an amine adduct liquid of a conductive composite, and a method of producing a conductive film.

Priority is claimed on Japanese Patent Application No. 2016-193967, filed on Sep. 30, 2016, the contents of which are incorporated herein by reference.

Description of Related Art

As a coating material for forming a conductive layer on a base film, a conductive polymer aqueous dispersion liquid obtained by doping poly(3,4-ethylenedioxythiophene) with polystyrene sulfonic acid is occasionally used.

Since a surface of a base film made of plastic is typically hydrophobic, the conductive polymer aqueous dispersion liquid serving as an aqueous coating material tends to have low wettability with respect to the base film. Therefore, the adhesiveness of the conductive layer to be formed to the base film is not excellent in some cases.

Further, since the time for drying water serving as a dispersion medium of the conductive polymer aqueous dispersion liquid is longer than that of an organic solvent, the drying process becomes a rate-limiting factor of the process of forming the conductive layer.

For the purpose of improving the wettability and reducing the drying time described above, a conductive polymer organic solvent dispersion liquid obtained by substituting water serving as a dispersion medium of a conductive polymer aqueous dispersion liquid with an organic solvent is used in some cases. As the conductive polymer organic solvent dispersion liquid, one obtained by freeze-drying a conductive polymer aqueous dispersion liquid containing a conductive composite formed of a π conjugated conductive polymer and a polyanion to obtain a dried product and adding an organic solvent and an amine compound to the dried product has been known (Patent Document 1).

PATENT DOCUMENT

[Patent Document 1] Japanese Unexamined Patent Application, First Publication No. 2011-032382

SUMMARY OF THE INVENTION

The conductive composite contained in the dried product described in Patent Document 1 is hydrophilic, but is changed to be lipophilic when an amine compound is added thereto. In this manner, an amine adduct liquid formed by dissolving or dispersing the amine adduct of the conductive composite in the organic solvent can be obtained. However, there is a problem in that solid matter is precipitated in the amine adduct liquid in a case where the amine adduct liquid is prepared in advance before use and stored. Since the base film cannot be coated with the amine adduct liquid in which a large amount of solid matter is precipitated, it is necessary to reduce the precipitation of solid matter during storage.

The present invention has been made in consideration of the above-described circumstances, and an object thereof is to provide a method of producing an amine adduct liquid of a conductive composite having excellent storage stability; a method of producing an amine adduct of a conductive composite which is a material of the amine adduct liquid, and a method of producing a conductive film obtained by using the amine adduct liquid.

[1] A method of producing an amine adduct of a conductive composite, including: adding an amine compound to a conductive polymer dispersion liquid which contains water and a conductive composite containing a π conjugated conductive polymer and a polyanion at a mass ratio of the π conjugated conductive polymer to the polyanion of 1:3 to 1:7.5 to precipitate an amine adduct of the conductive composite.

[2] The method of producing an amine adduct of a conductive composite according to [1], further including: adding an organic solvent to the conductive polymer dispersion liquid.

[3] The method of producing an amine adduct of a conductive composite according to [1] or [2], further including: collecting the precipitated amine adduct by filtration.

[4] The method of producing an amine adduct of a conductive composite according to [3], further including: washing the collected amine adduct with an organic solvent.

[5] The method of producing an amine adduct of a conductive composite according to [2], in which the organic solvent added to the conductive polymer dispersion liquid is isopropanol.

[6] The method of producing an amine adduct of a conductive composite according to [4], in which the organic solvent for washing the amine adduct is acetone.

[7] The method of producing an amine adduct of a conductive composite according to any one of [1] to [6], in which the π conjugated conductive polymer is poly(3,4-ethylenedioxythiophene).

[8] The method of producing an amine adduct of a conductive composite according to any one of [1] to [7], in which the polyanion is polystyrene sulfonic acid.

[9] The method of producing an amine adduct of a conductive composite according to any one of [1] to [8], in which the amine compound is trioctylamine or tributylamine.

[10] A method of producing an amine adduct liquid of a conductive composite including: obtaining an amine adduct of the conductive composite according to the production method according to any one of [1] to [9]; and dissolving or dispersing the amine adduct of the conductive composite in an organic solvent.

[11] The method of producing an amine adduct liquid of a conductive composite according to [10], in which the organic solvent is isopropanol or methyl ethyl ketone.

[12] The method of producing an amine adduct liquid of a conductive composite according to [10] or [11], further including: adding a binder component.

[13] The method of producing an amine adduct liquid of a conductive composite according to [12], in which the binder component has active energy ray curability.

[14] A method of producing a conductive film, including: a step of obtaining an amine adduct liquid of the conductive composite according to the production method according to any one of [10] to [13]; a coating step of coating at least one surface of a base film with the amine adduct liquid of the conductive composite; and a drying step of drying the applied amine adduct liquid.

[15] The method of producing a conductive film according to [14], in which the amine adduct liquid contains a binder component having active energy ray curability, and the method further includes an active energy ray irradiating step of irradiating a coated film of the dried amine adduct liquid with active energy rays after the drying step.

In the amine adduct liquid of the conductive composite obtained by the production method of the present invention, solid matter to be precipitated during storage is reduced and storage stability is excellent.

When the amine adduct of the conductive composite obtained by the production method of the present invention is used as a material of the amine adduct liquid, excellent storage stability is exhibited.

According to the method of producing a conductive film of the present invention, since an amine adduct liquid with less precipitates is used, a conductive layer having excellent adhesiveness and conductivity can be easily formed. Further, since the dispersion medium of the amine adduct liquid is an organic solvent, the time for the drying step can be reduced.

DETAILED DESCRIPTION OF THE INVENTION

<<Method of Producing Amine Adduct of Conductive Composite>>

According to a first embodiment of the present invention, there is provided a method of producing an amine adduct of a conductive composite, including: adding an amine compound to a conductive polymer dispersion liquid which contains water and a conductive composite containing a π conjugated conductive polymer and a polyanion at a mass ratio of the π conjugated conductive polymer to the polyanion of 1:3 to 1:7.5 to precipitate an amine adduct of the conductive composite.

In the present specification, the amine adduct of a conductive composite is simply referred to as an "amine adduct" in some cases. Further, the amine adduct indicates an amine compound being coordinated or bonded to some excess anion groups in the polyanion of the conductive composite. The excess anion groups indicate anion groups which do not contribute to doping of the π conjugated conductive polymer. The amount of excess anion groups is preferably in a range of 1% to 99% by mole and more preferably in a range of 10% to 90% by mole with respect to 100% by mole of all anion groups in the polyanion. The amount of the anion groups to which an amine compound is coordinated or bonded is preferably in a range of 1% to 99% by mole and more preferably in a range of 10% to 90% by mole with respect to 100% by mole of all excess anion groups.

<Conductive Polymer Dispersion Liquid>

The conductive polymer dispersion liquid contains a conductive composite containing a π conjugated conductive polymer and a polyanion; and an aqueous dispersion medium that disperses the conductive composite.

The π conjugated conductive polymer is not particularly limited as long as the polymer is an organic polymer whose main chain is formed of a π conjugated system and exhibits the effects of the present invention, and examples thereof include a polypyrrole-based conductive polymer, a polythiophene-based conductive polymer, a polyacetylene-based conductive polymer, a polyphenylene-based conductive polymer, a polyphenylene vinylene-based conductive polymer, a polyaniline-based conductive polymer, a polyacene-based conductive polymer, a polythiophene vinylene-based conductive polymer, and these copolymers. From the viewpoint of stability in air, a polypyrrole-based conductive polymer, polythiophenes, and a polyaniline-based conductive polymer are preferable. From the viewpoint transparency, a polythiophene-based conductive polymer is more preferable.

Examples of the polythiophene-based conductive polymer include polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butylenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), and poly(3-methyl-4-carboxybutylthiophene).

Examples of polypyrrole-based conductive polymer include polypyrrole, poly(N-methylpyrrole), poly(-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), and poly(3-methyl-4-hexyloxypyrrole).

Examples of the polyaniline-based conductive polymer include polyaniline, poly(2-methylaniline), poly(3-isobutylaniline), poly(2-anilinesulfonic acid), and poly(3-anilinesulfonic acid).

Among the above-described examples of the π conjugated conductive polymers, from the viewpoints of conductivity, transparency, and heat resistance, poly(3,4-ethylenedioxythiophene) is particularly preferable.

The π conjugated conductive polymer may be used alone or in combination of two or more kinds thereof.

The polyanion is a polymer having two or more monomer units, which contain an anion group, in a molecule. The anion group of this polyanion functions as a dopant to the π conjugated conductive polymer and improves the conductivity of the π conjugated conductive polymer.

As the anion group of the polyanion, a sulfo group or a carboxy group is preferable.

Specific examples of such a polyanion include a polymer containing a sulfonic acid group such as polystyrene sulfonic acid, polyvinylsulfonic acid, polyallylsulfonic acid, polyacrylsulfonic acid, polymethacrylsulfonic acid, poly(2-acrylamido-2-methylpropanesulfonic acid), polyisoprenesulfonic acid, polysulfoethyl methacrylate, poly(4-sulfobutylmethacrylate), or polymethacryloxybenzenesulfonic acid; and a polymer containing a carboxylic acid group such as polyvinylcarboxylic acid, polystyrenecarboxylic acid, polyallylcarboxylic acid, polyacrylcarboxylic acid, polymethacrylcarboxylic acid, poly(2-acrylamido-2-methylpropanecarboxylic acid), polyisoprenecarboxylic acid, or polyacrylic acid. These homopolymers or two or more copolymers may be used.

Among the above-described examples of the polyanion, from the viewpoint of further improving the conductivity, a polymer containing a sulfonic acid group is preferable and polystyrene sulfonic acid is more preferable.

The polyanion may be used alone or in combination of two or more kinds thereof.

The mass average molecular weight of the polyanion is preferably in a range of 20000 to 1000000 and more preferably in a range of 100000 to 500000.

The mass average molecular weight in the present specification is measured using gel permeation chromatography and is a value acquired by setting polystyrene as a standard substance.

The mass ratio of the $\pi$ conjugated conductive polymer to the polyanion is in a range of 1:3 to 1:7.5, preferably in a range of 1:3.5 to 1:7.0, more preferably in a range of 1:4 to 1:6.5, and still more preferably in a range of 1:4.5 to 1:6.

In a case where the mass ratio is greater than or equal to the above-described lower limit, the conductivity is sufficiently obtained and the storage stability of the amine adduct liquid of the conductive composite formed by dissolving or dispersing the amine adduct of the conductive composite in an organic solvent is further improved. Therefore, the generation of precipitates during the storage can be reduced.

In a case where the mass ratio is less than or equal to the above-described upper limit, the conductivity is sufficiently obtained and the storage stability of the amine adduct liquid of the conductive composite formed by dissolving or dispersing the amine adduct of the conductive composite in an organic solvent is further improved. Therefore, the gelation during the storage can be reduced.

(Method of Preparing Conductive Polymer Dispersion Liquid)

According to a method of preparing a conductive polymer dispersion liquid that contains the conductive composite having the above-described specific mass ratio, the conductive polymer dispersion liquid is obtained by applying a chemical oxidative polymerization to a monomer that forms the $\pi$ conjugated conductive polymer in a polyanion aqueous solution. By allowing the polyanion, which has the above-described mass ratio with the $\pi$ conjugated conductive polymer to be formed in the reaction solution, to be contained in the aqueous solution, a conductive composite in which the mass ratio is adjusted as desired can be obtained.

During the chemical oxidative polymerization, an oxidant such as ammonium persulfate or sodium persulfate may be used as a catalyst.

Further, as the conductive polymer aqueous dispersion liquid, commercially available products may be used.

The $\pi$ conjugated conductive polymer is coordinated and doped with the polyanion to form a conductive composite. Here, the $\pi$ conjugated conductive polymer is not doped with all anion groups of the polyanion, and excessive anion groups that do not contribute to the doping are present. The hydrophilicity of the conductive composite is sufficiently exhibited by the excessive anion groups.

The aqueous dispersion medium that disperses the conductive composite is water or a mixed solution of water and an organic solvent.

The content of water is preferably in a range of 60% by mass to 100% by mass, more preferably in a range of 70% by mass to 100% by mass, and still more preferably in a range of 80% by mass to 100% by mass with respect to the total mass (100% by mass) of the aqueous dispersion medium. In a case where the content of water in the aqueous dispersion medium is greater than or equal to the above-described lower limit, the dispersibility of the conductive composite in the conductive polymer dispersion liquid is further improved.

Examples of the organic solvent which may be contained in the aqueous dispersion medium include an alcohol-based solvent, an ether-based solvent, a ketone-based solvent, an ester-based solvent, and an aromatic hydrocarbon-based solvent. These organic solvents may be used alone or in combination of two or more kinds thereof.

Examples of the alcohol-based solvent include methanol, ethanol, isopropanol, n-butanol, t-butanol, and allyl alcohol.

Examples of the ether-based solvent include diethyl ether, dimethyl ether, ethylene glycol, propylene glycol, propylene glycol monoalkyl ether such as propylene glycol monomethyl ether, and propylene glycol dialkyl ether.

Examples of the ketone-based solvent include diethyl ketone, methyl propyl ketone, methyl butyl ketone, methyl isopropyl ketone, methyl isobutyl ketone, methyl amyl ketone, diisopropyl ketone, methyl ethyl ketone, acetone, and diacetone alcohol.

Examples of the ester-based solvent include ethyl acetate, propyl acetate, and butyl acetate.

Examples of the aromatic hydrocarbon-based solvent include benzene, toluene, xylene, ethyl benzene, propyl benzene, and isopropyl benzene.

In the present embodiment, an amine adduct of the conductive composite can be precipitated by adding an amine compound to the conductive polymer dispersion liquid containing the conductive composite and water.

According to the mechanism of the precipitation, it is considered that the precipitation of the amine adduct occurs due to addition of the added amine compound to the excess anion groups of the conductive composite to decrease the hydrophilicity thereof.

The amine compound to be added may be any of a primary amine, a secondary amine, a tertiary amine, and a quaternary ammonium salt. The amine compound may be used alone or in combination of two or more kinds thereof.

Examples of the hydrocarbon group which may be contained in the amine compound include a linear or branched alkyl group having 2 to 12 carbon atoms, an aryl group having 6 to 12 carbon atoms, an aralkyl group having 7 to 12 carbon atoms, an alkylene group having 2 to 12 carbon atoms, an arylene group having 6 to 12 carbon atoms, an aralkylene group having 7 to 12 carbon atoms, and an oxyalkylene group having 2 to 12 carbon atoms.

Examples of the substituent which the amine compound may contain on the hydrocarbon group include a hydroxyl group, an ester group, and an ether group.

Examples of the primary amine include aniline, toluidine, benzylamine, and ethanolamine.

Examples of the secondary amine include diethanolamine, dimethylamine, diethylamine, dipropylamine, diphenylamine, dibenzylamine, and dinaphthylamine.

Examples of the tertiary amine include triethanolamine, trimethylamine, triethylamine, tripropylamine, tributylamine, trioctylamine, triphenylamine, tribenzylamine, and trinaphthylamine.

Examples of the quaternary ammonium salt include a tetramethylammonium salt, a tetraethylammonium salt, a tetrapropylammonium salt, a tetraphenylammonium salt, a tetrabenzylammonium salt, and a tetranaphthylammonium salt. Examples of an anion to be paired with ammonium include hydroxide ions.

Among the amine compounds, from the viewpoint of facilitating the precipitation of the amine adduct, the tertiary amine is preferable and tributylamine and trioctylamine are more preferable.

The amount of the amine compound to be added can be sets to be in a range of, for example, 100 parts by mass to 3000 parts by mass with respect to 100 parts by mass of the conductive composite. The amount thereof is preferably in a range of 150 parts by mass to 2000 parts by mass, more preferably in a range of 200 parts by mass to 1500 parts by mass, and still more preferably in a range of 300 parts by mass to 1000 parts by mass.

In a case where the amount thereof is greater than or equal to the above-described lower limit, the amine adduct can be more easily precipitated. In a case where the amount thereof is lower than or equal to the above-described upper limit, it is possible to prevent degradation of the conductivity of the amine adduct due to addition of an excessive amount of amine compound to the amine adduct.

In the present embodiment, it is preferable that an organic solvent is further added to the conductive polymer dispersion liquid. The process of adding an organic solvent may be performed before, after, or simultaneously with the addition of the amine compound to the conductive polymer dispersion liquid.

Examples of the organic solvent to be further added to the conductive polymer dispersion liquid include an alcohol-based solvent, an ether-based solvent, a ketone-based solvent, an ester-based solvent, and an aromatic hydrocarbon-based solvent. Specific examples of these organic solvents include those described as the specific examples of the organic solvent which may be contained in the above-described aqueous dispersion medium in advance. It is preferable that the organic solvent to be added for the precipitation of the amine adduct is different from the organic solvent which may be contained in the above-describe aqueous dispersion medium.

Among the above-described examples of the organic solvent, from the viewpoint of facilitating the precipitation of the amine adduct, an alcohol-based solvent is preferable and isopropanol is more preferable. The organic solvent to be added for the precipitation of the amine adduct may be used alone or in combination of two or more kinds thereof.

The amount of the organic solvent to be added for the precipitation of the amine adduct can be sets to be in a range of, for example, 10 parts by mass to 1000 parts by mass with respect to 100 parts by mass of the conductive polymer dispersion liquid.

The amount thereof is preferably in a range of 30 parts by mass to 800 parts by mass, more preferably in a range of 50 parts by mass to 500 parts by mass, and still more preferably in a range of 70 parts by mass to 200 parts by mass.

In a case where the amount thereof is greater than or equal to the above-described lower limit, the amine adduct can be more easily precipitated.

In a case where the amount thereof is lower than or equal to the above-described upper limit, it is possible to prevent separation of the amine compound from the amine adduct.

(Method of Precipitating Amine Adduct)

The amine adduct formed by adding an amine compound to the conductive composite can be precipitated by adding an amine compound and an optional organic solvent to the conductive polymer dispersion liquid.

The content of the conductive composite to be contained in the conductive polymer dispersion liquid immediately before the addition of the amine compound can be set to be in a range of, for example, 0.1% by mass to 10% by mass with respect to the total mass of the conductive polymer dispersion liquid. The content thereof is preferably in a range of 0.5% by mass to 5% by mass, more preferably in a range of 1.0% by mass to 4% by mass, and still more preferably in a range of 1.5% by mass to 3% by mass.

In a case where the content thereof is greater than or equal to the above-described lower limit, the amine adduct can be more easily precipitated in a short time. In a case where the content thereof is lower than or equal to the above-described upper limit, it is possible to prevent precipitation of the conductive composite to which an amine has not been added because the conductive composite is involved in the precipitation of other amine adducts formed in advance.

The order of adding the amine compound and the organic solvent to the conductive polymer dispersion liquid is not particularly limited.

The organic solvent may be added thereto after the addition of the amine compound. The amine compound may be added thereto after the addition of the organic solvent. Alternatively, a mixed solution formed by mixing the amine compound and the organic solvent in advance may be added to the conductive polymer dispersion liquid. Among these, from the viewpoint that the amine compound and the organic solvent can be uniformly and rapidly added to the conductive polymer dispersion liquid, the method of adding the mixed solution to the conductive polymer dispersion liquid is preferable.

The amine adduct is naturally precipitated in the conductive polymer dispersion liquid to which the amine compound and the optional organic solvent have been added by allowing the dispersion liquid to stand or gently stirring the dispersion liquid. The temperature of the dispersion liquid during the precipitation can be set to be in a range of, for example, 5° C. to 80° C. The time taken for the precipitation of the amine adduct to be completed can be expected to be in a range of, for example, 5 minutes to 240 minutes.

(Method of Collecting Amine Adduct)

As the method of collecting the precipitated amine adduct of the conductive composite from the dispersion medium, methods of collecting a product known in the field of organic synthesis such as filtration, precipitation, or extraction can be applied.

Among these collection methods, filtration is preferable. In addition, it is preferable to use a filter with rough meshes to the extent that the polyanion used for formation of the conductive composite passes therethrough together with the filtrate. According to this filtration method, while the precipitated amine adduct is collected, the amine adduct and excess polyanions which are not used for formation of the conductive composite can be separated by leaving the excess polyanions on the filtrate side. The conductivity of the amine adduct can be improved by removing the excess polyanions.

As the filter used for the filtration, filter paper used in the field of chemical analysis is preferable. For example, filter paper (manufactured by Advantech Co., Ltd.) having a retention particle diameter of 7 μm is exemplified as the filter paper. Here, the retention particle diameter of filter paper is a measure of the roughness of meshes and is acquired from the leakage particle diameter used when barium sulfate or the like specified by JIS P 3801 [filter paper (for chemical analysis)] is naturally filtered. The retention particle diameter of filter paper can be set to be in a range of, 2 μm to 10 μm. From the viewpoint of easily separating the excess polyanions through transmission, the retention particle diameter is preferably in a range of 5 μm to 10 μm.

It is preferable that the collected amine adduct is washed with at least one of water and an organic solvent.

During the washing, excessive components collected with the amine adduct, such as the polyanion and the amine compound, are washed off and thus the conductivity of the amine adduct can be improved.

Examples of the organic solvent used for the washing include an alcohol-based solvent, an ether-based solvent, a ketone-based solvent, an ester-based solvent, and an aromatic hydrocarbon-based solvent described above. Among these, a ketone-based solvent is preferable and acetone is particularly preferable. When acetone is used, the above-described excessive components can be easily washed off and a decrease in amine adduct due to the washing can be suppressed.

According to the method of producing an amine adduct of a conductive composite described above, approximately 120 parts by mass to 1000 parts by mass of the amine adduct can be obtained with respect to 100 parts by mass of the conductive composite contained in the conductive polymer dispersion liquid.

According to the method of producing an amine adduct of a conductive composite of the present invention, it is preferable that the π conjugated conductive polymer is poly(3,4-ethylenedioxythiophene), the polyanion is polystyrene sulfonic acid, and the amine compound is trioctylamine or tributylamine.

According to the method of producing an amine adduct of a conductive composite of the present invention, it is preferable that the π conjugated conductive polymer is poly(3,4-ethylenedioxythiophene), the polyanion is polystyrene sulfonic acid, the amine compound is trioctylamine or tributylamine, and the amount of the amine compound to be added is in a range of 100 to 3000 parts by mass with respect to 100 parts by mass of the conductive composite.

It is preferable that the method of producing an amine adduct of a conductive composite of the present invention includes a process of adding an organic solvent to the conductive polymer dispersion liquid and the organic solvent is isopropanol.

According to the method of producing an amine adduct of a conductive composite of the present invention, it is preferable that the amine compound is added to the conductive polymer dispersion liquid in the form of a mixed solution of the amine compound and an organic solvent and the organic solvent is isopropanol.

<<Method of Producing Amine Adduct Liquid of Conductive Composite>>

According to a second embodiment of the present invention, a method of producing an amine adduct liquid includes obtaining an amine adduct according to the production method of the first embodiment and dissolving or dispersing the obtained amine adduct in an organic solvent. Here, the amine adduct liquid indicates a solution of a dispersion liquid of an amine adduct.

The amine adduct can be easily dissolved or dispersed in an organic solvent. Examples of the organic solvent forming the amine adduct liquid include an alcohol-based solvent, an ether-based solvent, a ketone-based solvent, an ester-based solvent, and an aromatic hydrocarbon-based solvent. Specific examples of these organic solvents include those described as the specific examples of the organic solvent which may be contained in the above-described aqueous dispersion medium in advance.

Among the above-described examples of the organic solvent, from the viewpoint of excellent dispersibility of the amine adduct, an alcohol-based solvent or a ketone-based solvent is preferable and isopropanol or methyl ethyl ketone is more preferable. The organic solvent that dissolves or disperses the amine adduct may be used alone or in combination of two or more kinds thereof.

The amount of the organic solvent that dissolves or disperses the amine adduct is preferably in a range of 100 to 1000000 parts by mass and more preferably in a range of 1000 to 100000 parts by mass with respect to 100 parts by mass of the amine adduct.

The concentration of the amine adduct dissolved or dispersed in the organic solvent can be set to be in a range of, for example, 0.1% by mass to 10% by mass with respect to the total mass of the amine adduct liquid.

In a case where the concentration thereof is greater than or equal to the above-described lower limit, a conductive layer formed by being coated with the amine adduct liquid may have excellent conductivity.

In a case where the concentration thereof is less than or equal to the above-described upper limit, the coatability of the amine adduct liquid with respect to a base film is improved so that the surface to be coated can be uniformly and easily coated with the amine adduct liquid without unevenness.

A method of dissolving or dispersing the amine adduct in the organic solvent is not particularly limited. A known method of dissolving or dispersing a conductive polymer or a typical synthetic resin in an organic solvent is applied. From the viewpoint of improving the dispersibility, it is preferable to use a pressurizable high pressure homogenizer.

The amine adduct liquid may contain a binder component, a highly conductive agent, and other additives.

(Binder Component)

The binder component is a component other than the π conjugated conductive polymer, the polyanion, and the amine compound and improves the mechanical strength or the hardness of the conductive layer formed by being coated with the amine adduct liquid.

Examples of the binder component include resins, thermosetting compounds, and active energy ray-curable compounds. In a case where a thermosetting compound is used, it is preferable that the amine adduct liquid also contains a thermal polymerization initiator. In a case where an active energy ray-curable compound is used, it is preferable that the amine adduct liquid also contains a photopolymerization initiator.

Examples of the resins which can be used as the binder component include an acrylic resin, a polyester resin, an epoxy resin, an oxetane resin, a polyurethane resin, a polyimide resin, a melamine resin, a silicone resin, and a vinyl acetate resin.

Examples of the thermosetting compound and the active energy ray-curable compound include a compound containing a vinyl group, a compound containing an epoxy group, and a compound containing an oxetane group. These may be monomers or oligomers.

Among the above-described examples of the binder components, from the viewpoints of being easily dispersed or dissolved in the organic solvent and ease of curing, an active energy ray-curable acrylic compound is preferable. The active energy ray curable acrylic compound is an acrylic compound that is radically polymerized and cured by being irradiated with active energy rays (ultraviolet rays, electron beams, and visible light rays).

Examples of the active energy ray curable acrylic compound include acrylate, methacrylate, (meth)acrylamide, vinyl ether, and carboxylic acid vinyl ester. Further, the active energy ray-curable acrylic compound may be a monofunctional monomer containing only one vinyl group, a polyfunctional monomer containing two or more vinyl groups, or a combination of a monofunctional monomer and a polyfunctional monomer.

Examples of the acrylate include 2-hydroxyethyl acrylate, 2-hydroxypropyl acrylate, 4-hydroxybutyl acrylate, isobornyl acrylate, tetrahydrofurfuryl acrylate, dipropylene glycol diacrylate, tripropylene glycol diacrylate, polyethylene glycol diacrylate, 1,6-hexanediol diacrylate, bisphenol A ethylene oxide-modified diacrylate, pentaerythritol triacrylate, dipentaerythritol hexaacrylate, dipentaerythritol pentaacrylate, dipentaerythritol monohydroxy pentaacrylate, trimethylolpropane triacrylate, and glycerin propoxy triacrylate.

Examples of the methacrylate include n-butyl methacrylate, t-butyl methacrylate, benzyl methacrylate, 2-ethylhexyl methacrylate, cyclohexyl methacrylate, allyl methacrylate, 2-hydroxyethyl methacrylate, isobornyl methacrylate, lauryl methacrylate, phenoxyethyl methacrylate, glycidyl methacrylate, tetrahydrofurfuryl methacrylate, diethylene glycol dimethacrylate, tetraethylene glycol dimethacrylate, 1,3-butylene glycol dimethacrylate, 1,6-hexanediol dimethacrylate, and trimethylolpropane trimethacrylate.

Examples of the (meth)acrylamide include methacrylamide, 2-hydroxyethyl acrylamide, N-methylacrylamide, N-t-butylacrylamide, N-isopropylacrylamide, N-phenylacrylamide, N-methylolacrylamide, dimethylaminopropyl acrylamide, dimethylaminopropyl methacrylamide, diacetone acrylamide, N,N-dimethylacrylamide, N-vinylformamide, acryloyl morpholine, and acryloyl piperidine.

Examples of the vinyl ether include 2-chloroethyl vinyl ether, cyclohexyl vinyl ether, ethyl vinyl ether, hydroxy butyl vinyl ether, isobutyl vinyl ether, and triethylene glycol vinyl ether.

Examples of the carboxylic acid vinyl ester include vinyl butyrate, vinyl monochloroacetate, and vinyl pivalate.

Further, the active energy ray-curable acrylic compound may be polyfunctional acrylate obtained by reacting an acrylic monomer and another compound, such as epoxy acrylate, urethane acrylate, polyester acrylate, and polyacrylic acrylate.

The active energy ray-curable acrylic compound may be used alone or in combination of two or more kinds thereof.

The content of the binder component is preferably in a range of 1000 parts by mass to 100000 parts by mass and more preferably in a range of 3000 parts by mass to 50000 parts by mass with respect to 100 parts by mass of the conductive composite. In a case where the content of the binder component is greater than or equal to the above-described lower limit, the strength and the hardness of the conductive layer to be obtained can be sufficiently improved. In a case where the content thereof is less than or equal to the above-described upper limit, the conductivity can be sufficiently ensured.

The total concentration of the solid content (non-volatile content) in the binder component to be added to the amine adduct liquid is preferably in a range of 100 parts by mass to 100000 parts by mass, more preferably in a range of 1000 parts by mass to 50000 parts by mass, and still more preferably in a range of 5000 parts by mass to 20000 parts by mass with respect to 100 parts by mass of the amine adduct.

In a case where the total concentration thereof is greater than or equal to the above-described lower limit, the mechanical strength or the hardness of the conductive layer to be formed can be sufficiently improved.

In a case where the total concentration thereof is less than or equal to the above-described upper limit, the conductivity of the conductive layer to be formed can be sufficiently obtained.

(Highly Conductive Agent)

The highly conductive agent which may be contained in the amine adduct liquid is a chemical agent that improves the conductivity of the amine adduct, excluding the amine compound, the π conjugated conductive polymer, the polyanion, and the binder component.

It is preferable that the highly conductive agent is at least one compound selected from the group consisting of saccharides, a nitrogen-containing aromatic cyclic compound, a compound containing two or more hydroxy groups, a compound containing one hydroxy group and one or more carboxy groups, a compound containing an amide group, a compound containing an imide group, a lactam compound, and a compound containing a glycidyl group.

The highly conductive agent may be used alone or in combination of two or more kinds thereof.

Examples of the nitrogen-containing aromatic cyclic compound include pyridines containing one nitrogen atom and derivatives thereof, imidazoles containing two nitrogen atoms and derivatives thereof, pyrimidines and derivatives thereof, pyrazines and derivatives thereof, and triazines containing three nitrogen atoms and derivatives thereof. From the viewpoint of solubility in a solvent, pyridines and derivatives thereof, imidazoles and derivatives thereof, and pyrimidines and derivatives thereof.

Specific examples of the pyridines and derivatives thereof include pyridine, 2-methylpyridine, 3-methylpyridine, 4-methylpyridine, 4-ethylpyridine, N-vinylpyridine, 2,4-dimethylpyridine, 2,4,6-trimethylpyridine, 3-cyano-5-methylpyridine, 2-pyridinecarboxylic acid, 6-methyl-2-pyridinecarboxylic acid, 4-pyridinecarboxaldehyde, 4-aminopyridine, 2,3-diaminopyridine, 2,6-diaminopyridine, 2,6-diamino-4-methylpyridine, 4-hydroxypyridine, 4-pyridinemethanol, 2,6-dihydroxypyridine, 2,6-pyridinedimethanol, methyl 6-hydroxy nicotinate, 2-hydroxy-5-pyridinemethanol, ethyl 6-hydroxy nicotinate, 4-pyridinemethanol, 4-pyridineethanol, 2-phenylpyridine, 3-methylquinoline, 3-ethylquinoline, quinolinol, 2,3-cyclopentenopyridine, 2,3-cyclohexanopyridine, 1,2-di(4-pyridyl)ethane, 1,2-di(4-pyridyl)propane, 2-pyridinecarboxaldehyde, 2-pyridinecarboxylic acid, 2-pyridinecarbonitrile, 2,3-pyridinedicarboxylic acid, 2,4-pyridinedicarboxylic acid, 2,5-pyridinedicarboxylic acid, 2,6-pyridinedicarboxylic acid, and 3-pyridinesulfonic acid.

Specific examples of the imidazoles and derivatives thereof include imidazole, 2-methylimidazole, 2-propylimidazole, 2-undecylimidazole, 2-phenylimidazole, N-methylimidazole, N-vinylimidazole, N-allylimidazole, 1-(2-hydroxyethyl)imidazole (N-hydroxyethylimidazole), 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazoledicarboxylic acid, dimethyl 4,5-imidazole dicarboxylate, benzimidazole, 2-aminobenzimidazole, 2-aminobenzimidazole-2-sulfonic acid, 2-amino-1-methylbenzimidazole, 2-hydroxybenzimidazole, and 2-(2-pyridyl)benzimidazole.

Specific examples of the pyrimidines and derivatives thereof include 2-amino-4-chloro-6-methylpyrimidine, 2-amino-6-chloro-4-methoxypyrimidine, 2-amino-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine, and 2,4-pyrimidinediol.

Specific examples of the pyrazines and derivatives thereof include pyrazine, 2-methylpyrazine, 2,5-dimethylpyrazine, pyrazinecarboxylic acid, 2,3-pyrazinedicarboxylic acid, 5-methylpyrazinecarboxylic acid, pyrazinamide, 5-methylpyrazinamide, 2-cyanopyrazine, aminopyrazine, 3-aminopyrazine-2-carboxylic acid, 2-ethyl-3-methylpyrazine, 2,3-dimethylpyrazine, and 2,3-diethylpyrazine.

Specific examples of the triazines and derivatives thereof include 1,3,5-triazine, 2-amino-1,3,5-triazine, 3-amino-1,2,4-triazine, 2,4-diamino-6-phenyl-1,3,5-triazine, 2,4,6-triamino-1,3,5-triazine, 2,4,6-tris(trifluoromethyl)-1,3,5-triazine, 2,4,6-tri-2-pyridine-1,3,5-triazine, 3-(2-pyridine)-5,6-bis(4-phenylsulfonic acid)-1,2,4-triazine disodium, 3-(2-pyridine)-5,6-diphenyl-1,2,4-triazine, 3-(2-pyridine)-5,6-diphenyl-1,2,4-triazine-p,p'-disulfonic acid disodium, and 2-hydroxy-4,6-dichloro-1,3,5-triazine.

Examples of the compound containing two or more hydroxy groups include polyhydric aliphatic alcohols such as propylene glycol, 1,3-butylene glycol, 1,4-butylene glycol, D-glucose, D-glucitol, isopropylene glycol, dimethylol propionic acid, butanediol, 1,5-pentanediol, 1,6-hexanediol, 1,9-nonanediol, neopentyl glycol, trimethylolethane, trimethylolpropane, pentaerythritol, dipentaerythritol, thiodiethanol, glycose, tartaric acid, D-glucaric acid, and glutaconic acid; polymer alcohol such as cellulose, polysaccharides, and sugar alcohol; aromatic compounds such as 1,4-dihydroxybenzene, 1,3-dihydroxybenzene, 2,3-dihydroxy-1-pentadecylbenzene, 2,4-dihydroxyacetophenone, 2,5-dihydroxyacetophenone, 2,4-dihydroxybenzophenone, 2,6-dihydroxybenzophenone, 3,4-dihydroxybenzophenone, 3,5-dihydroxybenzophenone, 2,4'-dihydroxydiphenylsulfone, 2,2',5,5'-tetrahydroxydiphenylsulfone, 3,3',5,5'-tetramethyl-4,4'-dihydroxydiphenylsulfone, hydroxyquinonecarboxylic acid and salts thereof, 2,3-dihydroxybenzoic acid, 2,4-dihydroxybenzoic acid, 2,5-dihydroxybenzoic acid, 2,6-dihydroxybenzoic acid, 3,5-dihydroxybenzoic acid, 1,4-hydroquinonesulfonic acid and salts thereof, 4,5-hydroxybenzene-1,3-disulfonic acid and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylic acid, 1,6-dihydroxynaphthalene-2,5-dicarboxylic acid, 1,5-dihydroxynaphthoic acid, 1,4-dihydroxy-2-naphthoic acid phenyl ester, 4,5-dihydroxynaphthalene-2,7-disulfonic acid and salts thereof, 1,8-dihydroxy-3,6-naphthalenedisulfonic acid and salts thereof, 6,7-dihydroxy-2-naphthalenesulfonic acid and salts thereof, 1,2,3-trihydroxybenzene (pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxybenzoic acid, trihydroxyacetophenone, trihydroxybenzophenone, trihydroxybenzoaldehyde, trihydroxyanthraquinone, 2,4,6-trihydroxybenzene, tetrahydroxy-p-benzoquinone, tetrahydroxyanthraquinone, methyl gallate, and ethyl gallate; and potassium hydroquinone sulfonate.

Examples of the compound containing one or more hydroxy groups and one or more carboxy groups include tartaric acid, glyceric acid, dimethylolbutanoic acid, dimethylolpropanoic acid, D-glucaric acid, and glutaconic acid.

The compound containing an amide group is a monomolecular compound having an amide bond represented by —CO—NH— (the CO moiety is a double bond) in a molecule. In other words, examples of the amide compound include a compound containing a functional group at both ends of the bond, a compound formed by a cyclic compound being bonded to one end of the bond, and urea and a urea derivative in which the functional group at both ends is hydrogen.

Specific examples of the amide compound include acetamide, malonamide, succinamide, maleamide, fumaramide, benzamide, naphthamide, phthalamide, isophthalamide, terephthalamide, nicotinamide, isonicotinamide, 2-furamide, formamide, N-methylformamide, propionamide, propiolamide, butyramide, isobutyramide, palmitamide, stearylamide, oleamide, oxamide, glutaramide, adipamide, cinnamamide, glycolamide, lactamide, glyceramide, tartaramide, citramide, glyoxylamide, pyruvamide, acetoacetamide, dimethylacetamide, benzylamide, anthranilamide, ethylenediamine tetraacetamide, diacetamide, triacetamide, dibenzamide, tribenzamide, rhodamine, urea, 1-acetyl-2-thiourea, biuret, butylurea, dibutylurea, 1,3-dimethylurea, 1,3-diethylurea, and derivatives of these.

Further, acrylamide can be used as an amide compound. Examples of the acrylamide include N-methylacrylamide, N-methylmethacrylamide, N-ethylacrylamide, N-ethylmethacrylamide, N,N-dimethylacrylamide, N,N-dimethylmethacrylamide, N,N-diethylacrylamide, N,N-diethylmethacrylamide, 2-hydroxyethylacrylamide, 2-hydroxyethylmethacrylamide, N-methylolacrylamide, and N-methylolmethacrylamide.

The molecular weight of the amide compound is preferably in a range of 46 to 10000, more preferably in a range of 46 to 5000, and particularly preferably in a range of 46 to 1000.

As the amide compound, from the viewpoint of excellent conductivity, a monomolecular compound having an imide bond (hereinafter, referred to as an imide compound) is preferable. Examples of the imide compound include, based on the skeleton thereof, phthalimide and a phthalimide derivative, succinimide and a succinimide derivative, benzimide and a benzimide derivative, maleimide and a maleimide derivative, and naphthalimide and a naphthalimide derivative.

Further, the imide compound is classified into aliphatic imide, aromatic imide, and the like based on the type of functional group at both ends. From the viewpoint of solubility, aliphatic imide is preferable.

Further, an aliphatic imide compound is classified into a saturated aliphatic imide compound which does not have an unsaturated bond between carbons in a molecule and an unsaturated aliphatic imide compound which has an unsaturated bond between carbons in a molecule.

The saturated aliphatic imide compound is a compound represented by $R^1$—CO—NH—CO—$R^2$ ($R^1$ and $R^2$ represent saturated hydrocarbon). Specific examples thereof include cyclohexane-1,2-dicarboxyimide, allantoin, hydantoin, barbituric acid, alloxane, glutarimide, succinimide, 5-butylhydantoic acid, 5,5-dimethylhydantoin, 1-methylhydantoin, 1,5,5-trimethylhydantoin, 5-hydantoin acetic acid, N-hydroxy-5-norbornene-2,3-dicarboxyimide, semicarbazide, α,α-dimethyl-6-methylsuccinimide, bis[2-(succinimideoxycarbonyloxy)ethyl]sulfone, α-methyl-α-propylsuccinimide, and cyclohexylimide.

The unsaturated aliphatic imide compound is a compound represented by $R^1$—CO—NH—CO—$R^2$ (one or both of $R^1$ and $R^2$ are one or more unsaturated bonds). Specific examples thereof include 1,3-dipropyleneurea, maleimide, N-methylmaleimide, N-ethylmaleimide, N-hydroxymaleimide, 1,4-bismaleimidebutane, 1,6-bismaleimidehexane, 1,8-bismaleimideoctane, and N-carboxyheptylmaleimide.

The molecular weight of the imide compound is preferably in a range of 60 to 5000, more preferably in a range of 70 to 1000, and particularly preferably in a range of 80 to 500.

The lactam compound is an intramolecular cyclic amide of aminocarboxylic acid and is a compound in which a part of the cycle is —CO—NR— (R represents hydrogen or an optional substituent). Here, one or more carbon atoms in the ring may be substituted with unsaturated or heteroatoms.

Examples of the lactam compound include pentane-4-lactam, 4-pentanelactam-5-methyl-2-pyrrolidone, 5-methyl-2-pyrrolidinone, hexane-6-lactam, and 6-hexanelactam.

Examples of the compound containing a glycidyl group include glycidyl compounds such as ethyl glycidyl ether, butyl glycidyl ether, t-butyl glycidyl ether, allyl glycidyl ether, benzyl glycidyl ether, glycidyl phenyl ether, bisphenol A, diglycidyl ether, acrylic acid glycidyl ether, and methacrylic acid glycidyl ether.

The content of the highly conductive agent is preferably in a range of 1 time to 1000 times and more preferably in a range of 2 times to 100 times the total mass of the amine adduct. In a case where the content of the highly conductive agent is greater than or equal to the above-described lower limit, the effect of improving the conductivity through the addition of the highly conductive agent is sufficiently exhibited. In a case where the content thereof is less than or equal to the upper limit, degradation of the conductivity caused by a decrease in concentration of the π conjugated conductive polymer can be prevented.

(Other Additives)

The amine adduct liquid may contain known additives. The additives are not limited as long as the scope of the present invention is not impaired, and examples thereof include a surfactant, an inorganic conductive agent, a defoaming agent, a coupling agent, an antioxidant, and an ultraviolet absorbing agent. Here, the additives are compounds other than the amine compound, the π conjugated conductive polymer, the polyanion, the binder component, and the highly conductive agent.

Examples of the surfactant include non-ionic surfactants, anionic surfactants, and cationic surfactants. From the viewpoint of storage stability, non-ionic surfactants are preferable. Further, a polymer-based surfactant such as polyvinylpyrrolidone may be added.

Examples of the inorganic conductive agent include metal ions and conductive carbon. In addition, the metal ions can be generated by dissolving metal salts in water. Examples of the defoaming agent include a silicon resin, polydimethylsiloxane, and silicone oil.

Examples of the coupling agent include a silane coupling agent containing a vinyl group, an amino group, an epoxy group, and the like.

Examples of the antioxidant include a phenol-based antioxidant, an amine-based antioxidant, a phosphorus-based antioxidant, a sulfur-based antioxidant, and saccharides.

Examples of the ultraviolet absorbing agent include a benzotriazole-based ultraviolet absorbing agent, a benzophenone-based ultraviolet absorbing agent, a salicylate-based ultraviolet absorbing agent, a cyanoacrylate-based ultraviolet absorbing agent, an oxanilide ultraviolet absorbing agent, a hindered amine-based ultraviolet absorbing agent, and a benzoate-based ultraviolet absorbing agent.

In a case where the amine adduct liquid contains the above-described additives, the content thereof is appropriately determined according to the type of additive. For example, the content thereof can be set to be in a range of 0.001 parts by mass to 5 parts by mass with respect to 100 parts by mass of the solid content (non-volatile content) in the conductive composite.

In a case where the amine adduct liquid is stored in a temperature range of 20° C. to 28° C. for 1 week, it is preferable that the precipitation of the solid matter is not visually recognized.

According to the method of producing an amine adduct liquid of a conductive composite of the present invention, it is preferable that the π conjugated conductive polymer is poly(3,4-ethylenedioxythiophene), the polyanion is polystyrene sulfonic acid, the amine compound is trioctylamine or tributylamine, and the organic solvent which dissolves or disperses the amine adduct is isopropanol or methyl ethyl ketone.

According to the method of producing an amine adduct liquid of a conductive composite of the present invention, it is preferable that the π conjugated conductive polymer is poly(3,4-ethylenedioxythiophene), the polyanion is polystyrene sulfonic acid, the amine compound is trioctylamine or tributylamine, the organic solvent which dissolves or disperses the amine adduct is isopropanol or methyl ethyl ketone, and the amount of the organic solvent, which dissolves or disperses the amine adduct, to be added is in a range of 1000 to 100000 parts by mass with respect to 100 parts by mass of the amine adduct.

<<Method of Producing Conductive Film>>

According to a third embodiment of the present invention, a method of producing a conductive film includes a step of obtaining an amine adduct liquid according to the production method of the second embodiment, a coating step of coating at least one surface of a base film with an amine adduct liquid, and a drying step of drying the applied amine adduct liquid.

The produced conductive film is suitable for applications of an antistatic film and the like.

In a case where the amine adduct liquid contains an active energy ray-curable binder component, the method may include an active energy ray irradiating step of irradiating the dried coated film with active energy rays after the drying step. When the method includes the active energy ray irradiating step, the speed of forming the conductive layer can be increased so that the productivity of the conductive film is improved.

The conductive film obtained by the above-described production method includes a base film and a conductive layer formed on at least one surface of the base film. The conductive layer contains the amine adduct of the third embodiment.

The average thickness of the conductive layer is preferably in a range of 10 nm to 20000 nm, more preferably in a range of 20 nm to 10000 nm, and still more preferably in a range of 30 nm to 5000 nm. In a case where the average thickness of the conductive layer is greater than or equal to the above-described lower limit, high conductivity can be sufficiently exhibited. In a case where the average thickness of the conductive layer is less than or equal to the above-described upper limit, the conductive layer can be easily formed. The average thickness of the conductive layer is a value obtained by measuring the thickness of the conductive layer on optional 10 sites using a thickness gauge and averaging the measured values.

As the base film used during the coating step of the present embodiment, a plastic film is exemplified.

Examples of the resin for a base film which forms a plastic film include an ethylene-methyl methacrylate copolymer resin, an ethylene-vinyl acetate copolymer resin, polyethylene, polypropylene, polystyrene, polyvinyl chloride, polyvinyl alcohol, polyethylene terephthalate, polybutylene terephthalate, polyethylene naphthalate, polyacrylate, polycarbonate, polyvinylidene fluoride, polyarylate, a styrene-based elastomer, a polyester-based elastomer, polyether sulfone, polyether imide, polyether ether ketone, polyphenylene sulfide, polyimide, cellulose triacetate, and cellulose acetate propionate. Among these resins for a base film, from the viewpoints of low cost and excellent mechanical strength, polyethylene terephthalate and cellulose triacetate are preferable.

The resin for a base film may be amorphous or crystalline. Further, the base film may be unstretched or stretched.

Further, in order to improve the adhesiveness of the conductive layer to be formed from the conductive polymer dispersion liquid, the base film may be subjected to a surface treatment such as a corona discharge treatment, a plasma treatment, or a flame treatment.

The average thickness of the base film is preferably in a range of 10 μm to 500 μm and more preferably in a range of 20 μm to 200 μm. In a case where the average thickness of the base film is greater than or equal to the above-described lower limit, the film is unlikely to be broken. In a case where the average thickness of the base film is less than or equal to the upper limit, the base film can ensure sufficient flexibility.

The thickness of the base film is a value obtained by measuring the thickness of the base film on optional 10 sites using a thickness gauge and averaging the measured values.

Examples of the method of coating the film with the amine adduct liquid include a coating method using a coater such as a gravure coater, a roll coater, a curtain flow coater, a spin coater, a bar coater, a reverse coater, a kiss coater, a fountain coater, a rod coater, an air doctor coater, a knife coater, a blade coater, a cast coater, or a screen coater; a spray method using a sprayer such as air spray, airless spray, or rotor dampening; and an immersion method such as dipping.

In a case of commercially available bar coaters, numbers are given for each type of bar coater, and the liquid can be applied thicker when the number of bar coater becomes larger.

The amount of the amine adduct liquid to be applied to the base film is not particularly limited, but is preferably in a range of 0.1 g/m$^2$ to 2.0 g/m$^2$ as the solid content (non-volatile content).

Examples of the drying method during the drying step include natural drying, drying by hot air, drying by heating, and drying in vacuum. As the drying by heating, a typical method such as heating by hot air or heating using infrared rays can be employed.

The heating temperature for the drying by heating is appropriately set according to the type of the organic solvent contained in the coated film and can be set to be in a range of, for example, 50° C. to 150° C. Here, the heating temperature is a set temperature of a drying device. The drying time can be set to be in a range of, for example, 30 seconds to 5 minutes.

In a case where the method includes the active energy ray irradiating step, examples of the active energy ray to be used include ultraviolet rays, electron beams, and visible light rays. Among the examples of the active energy rays, from the viewpoint of general purpose, ultraviolet rays are preferable. During the irradiation with ultraviolet rays, for example, light sources such as an ultrahigh pressure mercury lamp, a high pressure mercury lamp, a low pressure mercury lamp, a carbon arc, a xenon arc, and a metal halide lamp.

The illuminance during the irradiation with ultraviolet rays is preferably in a range of 100 mW/cm$^2$ to 500 mW/cm$^2$. In a case where the illuminance is greater than or equal to 100 mW/cm$^2$, the active energy ray-curable binder component can be sufficiently cured. Further, the integrated light intensity is preferably in a range of 50 mJ/cm$^2$ to 1000 mJ/cm$^2$. In a case where the integrated light intensity is greater than or equal to 50 mJ/cm$^2$, the binder component can be sufficiently cross-linked. Further, the illuminance and the integrated light intensity described above are values measured using UVR-T1 (industrial UV checker, photodetector: UD-T36, measurement wavelength range: 300 nm to 390 nm, peak sensitivity wavelength: approximately 355 nm, manufactured by TOPCON CORPORATION).

The average thickness of the conductive layer to be formed on the base film can be set to be in a range of, for example, 10 nm to 100 μm. Here, the average thickness of the conductive layer is a value obtained by measuring the thickness of the conductive layer on optional 10 sites using a thickness gauge and averaging the measured values. In a case where the average thickness of the conductive layer is greater than or equal to the above-described lower limit, excellent conductivity can be obtained. In a case where the average thickness thereof is less than or equal to the above-described upper limit, the conductive layer can be easily formed.

According to the method of producing a conductive film, since the dispersion medium of the amine adduct liquid is an organic solvent, the wettability with respect to the base film is excellent. Therefore, a conductive film having excellent adhesiveness to the conductive layer and the base film can be obtained.

According to the method of producing a conductive film of the present invention, it is preferable that the base film is a PET film, the π conjugated conductive polymer is poly(3,4-ethylenedioxythiophene), the polyanion is polystyrene sulfonic acid, and the amine compound is trioctylamine or tributylamine.

According to the method of producing an amine adduct of a conductive composite of the present invention, since a conductive composite in which the mass ratio of the π conjugated conductive polymer to the polyanion has been adjusted to be in a range of 1:3 to 1:7.5 is used, the storage stability of the amine adduct to be obtained is improved. This mechanism is unclear, but the form with excellent storage stability is considered to be obtained by a part of anion groups derived from the polyanion contained in the conductive composite being bonded to the amine compound.

EXAMPLES

Production Example 1

206 g of sodium styrene sulfonate was dissolved in 1000 mL of ion exchange water, 1.14 g of an ammonium persulfate oxidant solution which had been dissolved in 10 mL of water in advance was added dropwise to the solution for 20 minutes while the solution was stirred at 80° C., and the resulting solution was stirred for 12 hours.

1000 mL of sulfuric acid diluted at a concentration of 10% by mass was added to the obtained sodium styrene sulfonate-containing solution, approximately 1000 mL of the polystyrene sulfonic acid-containing solution was removed by an ultrafiltration method, 2000 mL of ion exchange water was added to the residual liquid, and approximately 2000 mL of the solution was removed by the ultrafiltration method. The above-described ultrafiltration operation was repeated three times. Further, approximately 2000 mL of ion exchange water was added to the obtained filtrate, and approximately 2000 mL of the solution was removed by the ultrafiltration method. The above-described ultrafiltration operation was repeated three times.

Water in the obtained solution was removed under reduced pressure, thereby obtaining polystyrene sulfonic acid (average molecular weight of 200000) in the form of colorless solid matter. Next, obtained polystyrene sulfonic acid was dissolved in water to obtain a 10% polystyrene sulfonic acid aqueous solution.

Production Example 2

206 g of sodium styrene sulfonate was dissolved in 1000 mL of ion exchange water, 0.76 g of an ammonium persulfate oxidant solution which had been dissolved in 10 mL of water in advance was added dropwise to the solution for 20 minutes while the solution was stirred at 80° C., and the resulting solution was stirred for 12 hours.

1000 mL of sulfuric acid diluted at a concentration of 10% by mass was added to the obtained sodium styrene sulfonate-containing solution, approximately 1000 mL of the polystyrene sulfonic acid-containing solution was removed by an ultrafiltration method, 2000 mL of ion exchange water was added to the residual liquid, and approximately 2000 mL of the solution was removed by the ultrafiltration method. The above-described ultrafiltration operation was repeated three times. Further, approximately 2000 mL of ion exchange water was added to the obtained filtrate, and approximately 2000 mL of the solution was removed by the ultrafiltration method. The above-described ultrafiltration operation was repeated three times.

Water in the obtained solution was removed under reduced pressure, thereby obtaining polystyrene sulfonic acid (average molecular weight of 300000) in the form of colorless solid matter. Next, obtained polystyrene sulfonic acid was dissolved in water to obtain a 10% polystyrene sulfonic acid aqueous solution.

Production Example 3

0.5 g of 3,4-ethylenedioxythiophene and a solution obtained by dissolving 15 g of the polystyrene sulfonic acid aqueous solution of Production Example 1 in 137.6 mL of ion exchange water were mixed at 20° C.

0.3 g of ammonium persulfate dissolved in 13.6 mL of ion exchange water and an oxidation catalyst solution containing 1.1 g of ferric sulfate were slowly added to the mixed solution obtained in the above-described manner while the temperature of the mixed solution was maintained at 20° C. and the solution was stirred. Further, the resulting solution was stirred for 3 hours and reacted.

7.0 g of a cation exchange resin was added to the obtained reaction solution, the solution was stirred for 1 hour, and the cation exchange resin was removed by filtration, thereby obtaining 1.2% by mass of polystyrene sulfonic acid-doped poly(3,4-ethylenedioxythiophene) aqueous dispersion liquid (PEDOT-PSS aqueous dispersion liquid).

Production Example 4

0.5 g of 3,4-ethylenedioxythiophene and a solution obtained by dissolving 15 g of the polystyrene sulfonic acid aqueous solution of Production Example 2 in 137.6 mL of ion exchange water were mixed at 20° C.

0.3 g of ammonium persulfate dissolved in 13.6 mL of ion exchange water and an oxidation catalyst solution containing 1.1 g of ferric sulfate were slowly added to the mixed solution obtained in the above-described manner while the temperature of the mixed solution was maintained at 20° C. and the solution was stirred. Further, the resulting solution was stirred for 3 hours and reacted.

7.0 g of a cation exchange resin was added to the obtained reaction solution, the solution was stirred for 1 hour, and the cation exchange resin was removed by filtration, thereby obtaining 1.2% by mass of polystyrene sulfonic acid-doped poly(3,4-ethylenedioxythiophene) aqueous dispersion liquid (PEDOT-PSS aqueous dispersion liquid).

Production Example 5

0.5 g of 3,4-ethylenedioxythiophene and a solution obtained by dissolving 25 g of the polystyrene sulfonic acid aqueous solution of Production Example 1 in 127.6 mL of ion exchange water were mixed at 20° C.

0.3 g of ammonium persulfate dissolved in 13.6 mL of ion exchange water and an oxidation catalyst solution containing 1.1 g of ferric sulfate were slowly added to the mixed solution obtained in the above-described manner while the temperature of the mixed solution was maintained at 20° C. and the solution was stirred. Further, the resulting solution was stirred for 3 hours and reacted.

7.0 g of a cation exchange resin was added to the obtained reaction solution, the solution was stirred for 1 hour, and the cation exchange resin was removed by filtration, thereby obtaining 1.8% by mass of polystyrene sulfonic acid-doped poly(3,4-ethylenedioxythiophene) aqueous dispersion liquid (PEDOT-PSS aqueous dispersion liquid).

Production Example 6

0.5 g of 3,4-ethylenedioxythiophene and a solution obtained by dissolving 25 g of the polystyrene sulfonic acid aqueous solution of Production Example 2 in 127.6 mL of ion exchange water were mixed at 20° C.

0.3 g of ammonium persulfate dissolved in 13.6 mL of ion exchange water and an oxidation catalyst solution containing 1.1 g of ferric sulfate were slowly added to the mixed solution obtained in the above-described manner while the temperature of the mixed solution was maintained at 20° C. and the solution was stirred. Further, the resulting solution was stirred for 3 hours and reacted.

7.0 g of a cation exchange resin was added to the obtained reaction solution, the solution was stirred for 1 hour, and the cation exchange resin was removed by filtration, thereby obtaining 1.8% by mass of polystyrene sulfonic acid-doped poly(3,4-ethylenedioxythiophene) aqueous dispersion liquid (PEDOT-PSS aqueous dispersion liquid).

Production Example 7

0.5 g of 3,4-ethylenedioxythiophene and a solution obtained by dissolving 37.5 g of the polystyrene sulfonic acid aqueous solution of Production Example 1 in 115.1 mL of ion exchange water were mixed at 20° C.

0.3 g of ammonium persulfate dissolved in 13.6 mL of ion exchange water and an oxidation catalyst solution containing 1.1 g of ferric sulfate were slowly added to the mixed solution obtained in the above-described manner while the temperature of the mixed solution was maintained at 20° C. and the solution was stirred. Further, the resulting solution was stirred for 3 hours and reacted.

7.0 g of a cation exchange resin was added to the obtained reaction solution, the solution was stirred for 1 hour, and the cation exchange resin was removed by filtration, thereby obtaining 2.55% by mass of polystyrene sulfonic acid-doped poly(3,4-ethylenedioxythiophene) aqueous dispersion liquid (PEDOT-PSS aqueous dispersion liquid).

Production Example 8

0.5 g of 3,4-ethylenedioxythiophene and a solution obtained by dissolving 37.5 g of the polystyrene sulfonic acid aqueous solution of Production Example 2 in 115.1 mL of ion exchange water were mixed at 20° C.

0.3 g of ammonium persulfate dissolved in 13.6 mL of ion exchange water and an oxidation catalyst solution containing 1.1 g of ferric sulfate were slowly added to the mixed solution obtained in the above-described manner while the temperature of the mixed solution was maintained at 20° C. and the solution was stirred. Further, the resulting solution was stirred for 3 hours and reacted.

7.0 g of a cation exchange resin was added to the obtained reaction solution, the solution was stirred for 1 hour, and the cation exchange resin was removed by filtration, thereby obtaining 2.55% by mass of polystyrene sulfonic acid-doped poly(3,4-ethylenedioxythiophene) aqueous dispersion liquid (PEDOT-PSS aqueous dispersion liquid).

Production Example 9

0.5 g of 3,4-ethylenedioxythiophene and a solution obtained by dissolving 10 g of the polystyrene sulfonic acid aqueous solution of Production Example 1 in 142.6 mL of ion exchange water were mixed at 20° C.

0.3 g of ammonium persulfate dissolved in 13.6 mL of ion exchange water and an oxidation catalyst solution containing 1.1 g of ferric sulfate were slowly added to the mixed solution obtained in the above-described manner while the temperature of the mixed solution was maintained at 20° C. and the solution was stirred. Further, the resulting solution was stirred for 3 hours and reacted.

7.0 g of a cation exchange resin was added to the obtained reaction solution, the solution was stirred for 1 hour, and the cation exchange resin was removed by filtration, thereby obtaining 0.9% by mass of polystyrene sulfonic acid-doped poly(3,4-ethylenedioxythiophene) aqueous dispersion liquid (PEDOT-PSS aqueous dispersion liquid).

Production Example 10

0.5 g of 3,4-ethylenedioxythiophene and a solution obtained by dissolving 10 g of the polystyrene sulfonic acid aqueous solution of Production Example 2 in 142.6 mL of ion exchange water were mixed at 20° C.

0.3 g of ammonium persulfate dissolved in 13.6 mL of ion exchange water and an oxidation catalyst solution containing 1.1 g of ferric sulfate were slowly added to the mixed solution obtained in the above-described manner while the temperature of the mixed solution was maintained at 20° C. and the solution was stirred. Further, the resulting solution was stirred for 3 hours and reacted.

7.0 g of a cation exchange resin was added to the obtained reaction solution, the solution was stirred for 1 hour, and the cation exchange resin was removed by filtration, thereby obtaining 0.9% by mass of polystyrene sulfonic acid-doped poly(3,4-ethylenedioxythiophene) aqueous dispersion liquid (PEDOT-PSS aqueous dispersion liquid).

Production Example 11

0.5 g of 3,4-ethylenedioxythiophene and a solution obtained by dissolving 50 g of the polystyrene sulfonic acid aqueous solution of Production Example 1 in 102.6 mL of ion exchange water were mixed at 20° C.

0.3 g of ammonium persulfate dissolved in 13.6 mL of ion exchange water and an oxidation catalyst solution containing 1.1 g of ferric sulfate were slowly added to the mixed solution obtained in the above-described manner while the temperature of the mixed solution was maintained at 20° C. and the solution was stirred. Further, the resulting solution was stirred for 3 hours and reacted.

7.0 g of a cation exchange resin was added to the obtained reaction solution, the solution was stirred for 1 hour, and the cation exchange resin was removed by filtration, thereby obtaining 3.3% by mass of polystyrene sulfonic acid-doped poly(3,4-ethylenedioxythiophene) aqueous dispersion liquid (PEDOT-PSS aqueous dispersion liquid).

Production Example 12

0.5 g of 3,4-ethylenedioxythiophene and a solution obtained by dissolving 50 g of the polystyrene sulfonic acid aqueous solution of Production Example 2 in 102.6 mL of ion exchange water were mixed at 20° C.

0.3 g of ammonium persulfate dissolved in 13.6 mL of ion exchange water and an oxidation catalyst solution containing 1.1 g of ferric sulfate were slowly added to the mixed solution obtained in the above-described manner while the temperature of the mixed solution was maintained at 20° C. and the solution was stirred. Further, the resulting solution was stirred for 3 hours and reacted.

7.0 g of a cation exchange resin was added to the obtained reaction solution, the solution was stirred for 1 hour, and the cation exchange resin was removed by filtration, thereby obtaining 3.3% by mass of polystyrene sulfonic acid-doped poly(3,4-ethylenedioxythiophene) aqueous dispersion liquid (PEDOT-PSS aqueous dispersion liquid).

Production Example 13

10 g of art resin UN-904M (manufactured by Negami Chemical Industrial Co., Ltd., urethane acrylate), 20 g of pentaerythritol triacrylate, 15 g of diacetone alcohol, and 1.2 g of IRGACURE 127 (manufactured by Ciba Specialty Chemicals Inc.) were mixed, thereby preparing a coating material.

Example 1

A mixed solution of 10.6 g of trioctylamine and 100 g of isopropanol was added to 100 g of the PEDOT-PSS aqueous dispersion liquid obtained in Production Example 3, and a trioctylamine adduct of PEDOT-PSS was allowed to be precipitated. The precipitated trioctylamine adduct of PEDOT-PSS was collected by filtration, washed with 100 g of water, and further washed with 100 g of acetone, and the trioctylamine adduct of PEDOT-PSS was extracted in the form of a solid. Filter paper (manufactured by Advantech Co., Ltd.) having a retention particle diameter of 7 μm was used for the filtration.

0.6 g of the obtained trioctylamine adduct of PEDOT-PSS was added to 100 g of isopropanol and dispersed therein using a high pressure homogenizer to obtain an isopropanol solution with the trioctylamine adduct of PEDOT-PSS at a concentration of 0.6%. The state of the solution after being stored at room temperature for 1 week is listed in Table 1.

Next, a PET film (manufactured by Toray Industries, Inc., LUMIRROR T-60) was coated with the obtained solution using a #4 bar coater to have a film thickness of approximately 9.1 μm and then dried at 120° C. for 1 hour. The result of measuring the surface resistance of the obtained film is listed in Table 1.

Next, 53.8 g of the obtained solution was mixed with 46.2 g of the coating material of Production Example 13, and a PET film (manufactured by Toray Industries, Inc., LUMIRROR T-60) was coated with the mixed solution using a #12 bar coater to have a film thickness of approximately 27 μm, dried at 120° C. for 1 hour, and irradiated with 400 mJ of ultraviolet rays. The result of measuring the surface resistance of the obtained film is listed in Table 1.

Example 2

The measurement was performed in the same manner as in Example 1 except that the PEDOT-PSS aqueous dispersion liquid obtained in Production Example 3 was changed into the PEDOT-PSS aqueous dispersion liquid obtained in Production Example 4. The measurement results are listed in Table 1.

Example 3

The measurement was performed in the same manner as in Example 1 except that the PEDOT-PSS aqueous dispersion liquid obtained in Production Example 3 was changed into the PEDOT-PSS aqueous dispersion liquid obtained in Production Example 5. The measurement results are listed in Table 1.

Example 4

The measurement was performed in the same manner as in Example 1 except that the PEDOT-PSS aqueous dispersion liquid obtained in Production Example 3 was changed into the PEDOT-PSS aqueous dispersion liquid obtained in Production Example 6. The measurement results are listed in Table 1.

Example 5

The measurement was performed in the same manner as in Example 1 except that the PEDOT-PSS aqueous dispersion liquid obtained in Production Example 3 was changed into the PEDOT-PSS aqueous dispersion liquid obtained in Production Example 7. The measurement results are listed in Table 1.

Example 6

The measurement was performed in the same manner as in Example 1 except that the PEDOT-PSS aqueous dispersion liquid obtained in Production Example 3 was changed into the PEDOT-PSS aqueous dispersion liquid obtained in Production Example 8. The measurement results are listed in Table 1.

Example 7

A mixed solution of 5.6 g of tributylamine and 100 g of isopropanol was added to 100 g of the PEDOT-PSS aqueous dispersion liquid obtained in Production Example 5, and a tributylamine adduct of PEDOT-PSS was allowed to be precipitated. The precipitated tributylamine adduct of PEDOT-PSS was collected by filtration, washed with 100 g of water, and further washed with 100 g of acetone, and the tributylamine adduct of PEDOT-PSS was extracted in the form of a solid. Except for the procedures described above, the measurement was performed in the same manner as in Example 1. The measurement results are listed in Table 1.

Example 8

A mixed solution of 5.6 g of tributylamine and 100 g of isopropanol was added to 100 g of the PEDOT-PSS aqueous dispersion liquid obtained in Production Example 6, and a tributylamine adduct of PEDOT-PSS was allowed to be precipitated. The precipitated tributylamine adduct of PEDOT-PSS was collected by filtration, washed with 100 g of water, and further washed with 100 g of acetone, and the tributylamine adduct of PEDOT-PSS was extracted in the form of a solid. Except for the procedures described above, the measurement was performed in the same manner as in Example 1. The measurement results are listed in Table 1.

Example 9

A mixed solution of 10.6 g of trioctylamine and 100 g of isopropanol was added to 100 g of the PEDOT-PSS aqueous dispersion liquid obtained in Production Example 5, and a trioctylamine adduct of PEDOT-PSS was allowed to be precipitated. The precipitated trioctylamine adduct of PEDOT-PSS was collected by filtration, washed with 100 g of water, and further washed with 100 g of acetone, and the trioctylamine adduct of PEDOT-PSS was extracted in the form of a solid. Filter paper (manufactured by Advantech Co., Ltd.) having a retention particle diameter of 7 μm was used for the filtration.

0.6 g of the obtained trioctylamine adduct of PEDOT-PSS was added to 100 g of methyl ethyl ketone and dispersed therein using a high pressure homogenizer to obtain a methyl ethyl ketone solution with the trioctylamine adduct of PEDOT-PSS at a concentration of 0.6%. The measurement was performed using this solution in the same manner as in Example 1. The measurement results are listed in Table 1.

Comparative Example 1

The measurement was performed in the same manner as in Example 1 except that the PEDOT-PSS aqueous dispersion liquid obtained in Production Example 3 was changed into the PEDOT-PSS aqueous dispersion liquid obtained in Production Example 9. The measurement results are listed in Table 1.

Comparative Example 2

The measurement was performed in the same manner as in Example 1 except that the PEDOT-PSS aqueous dispersion liquid obtained in Production Example 3 was changed into the PEDOT-PSS aqueous dispersion liquid obtained in Production Example 10. The measurement results are listed in Table 1.

Comparative Example 3

The measurement was performed in the same manner as in Example 1 except that the PEDOT-PSS aqueous dispersion liquid obtained in Production Example 3 was changed into the PEDOT-PSS aqueous dispersion liquid obtained in Production Example 11. The measurement results are listed in Table 1.

Comparative Example 4

The measurement was performed in the same manner as in Example 1 except that the PEDOT-PSS aqueous dispersion liquid obtained in Production Example 3 was changed into the PEDOT-PSS aqueous dispersion liquid obtained in Production Example 12. The measurement results are listed in Table 1.

Comparative Example 5

The measurement was performed in the same manner as in Example 7 except that the PEDOT-PSS aqueous dispersion liquid obtained in Production Example 5 was changed into the PEDOT-PSS aqueous dispersion liquid obtained in Production Example 9. As the result, since the mixture was not able to be dispersed even when a high pressure homogenizer was used and separated into two phases, the measurement was stopped.

Comparative Example 6

The measurement was performed in the same manner as in Example 7 except that the PEDOT-PSS aqueous dispersion liquid obtained in Production Example 5 was changed into the PEDOT-PSS aqueous dispersion liquid obtained in Production Example 11. As the result, since the solid was not able to be collected due to clogging of the tributylamine adduct of PEDOT-PSS by filter paper during the filtration, the measurement was stopped.

Comparative Example 7

The measurement was performed in the same manner as in Example 9 except that the PEDOT-PSS aqueous dispersion liquid obtained in Production Example 5 was changed into the PEDOT-PSS aqueous dispersion liquid obtained in Production Example 9. The measurement results are listed in Table 1.

Comparative Example 8

The measurement was performed in the same manner as in Example 9 except that the PEDOT-PSS aqueous dispersion liquid obtained in Production Example 5 was changed into the PEDOT-PSS aqueous dispersion liquid obtained in Production Example 11. The measurement results are listed in Table 1.

The abbreviations in Table 1 are as follows.
TOA: trioctylamine
TBA: tributylamine
IPA: isopropanol
MEK: methyl ethyl ketone

TABLE 1

| | Weight ratio of conductive polymer to polyanion | Amine compound used for precipitation | Organic solvent used for dispersion | State of solution stored for 1 week after preparation | Surface resistance of film coated with solution and dried ($\Omega$/Sq.) | Surface resistance of film coated with coating material and dried ($\Omega$/Sq.) |
|---|---|---|---|---|---|---|
| Example 1 | 1:3 | TOA | IPA | Small amount of foreign matter | 9.0E+06 | 2.0E+07 |
| Example 2 | 1:3 | TOA | IPA | Small amount of foreign matter | 3.0E+05 | 3.0E+06 |
| Example 3 | 1:5 | TOA | IPA | Foreign matter was not found | 1.0E+05 | 2.0E+07 |
| Example 4 | 1:5 | TOA | IPA | Foreign matter was not found | 5.0E+05 | 3.0E+08 |
| Example 5 | 1:7.5 | TOA | IPA | Foreign matter was not found | 7.0E+05 | 7.0E+07 |
| Example 6 | 1:7.5 | TOA | IPA | Foreign matter was not found | 6.0E+05 | 3.0E+08 |
| Example 7 | 1:5 | TBA | IPA | Foreign matter was not found | 9.0E+04 | 4.0E+07 |
| Example 8 | 1:5 | TBA | IPA | Foreign matter was not found | 2.0E+06 | 4.0E+08 |
| Example 9 | 1:5 | TOA | MEK | Foreign matter was not found | 5.0E+05 | 6.0E+07 |
| Comparative Example 1 | 1:2 | TOA | IPA | Large amount of foreign matter | 4.0E+08 | 7.0E+09 |
| Comparative Example 2 | 1:2 | TOA | IPA | Large amount of foreign matter | 1.0E+12 or greater | 1.0E+12 or greater |
| Comparative Example 3 | 1:10 | TOA | IPA | Gelation | 4.0E+05 | 9.0E+07 |
| Comparative Example 4 | 1:10 | TOA | IPA | Gelation | 2.0E+08 | 1.0E+12 or greater |
| Comparative | 1:2 | TBA | IPA | — | — | — |

TABLE 1-continued

| | Weight ratio of conductive polymer to polyanion | Amine compound used for precipitation | Organic solvent used for dispersion | State of solution stored for 1 week after preparation | Surface resistance of film coated with solution and dried (Ω/Sq.) | Surface resistance of film coated with coating material and dried (Ω/Sq.) |
|---|---|---|---|---|---|---|
| Example 5 Comparative Example 6 | 1:10 | TBA | IPA | — | — | — |
| Comparative Example 7 | 1:2 | TOA | MEK | Large amount of foreign matter | 4.0E+05 | 6.0E+07 |
| Comparative Example 8 | 1:10 | TOA | MEK | Gelation | 3.0E+05 | 3.0E+07 |

<Consideration>

As shown in the above-described results, in each of the amine adducts of Examples 1 to 9 in which the weight ratio of the conductive polymer to the polyanion was 1:3 to 1:7.5, the storage stability when the amine adduct was formed into a solution was excellent, and the surface resistance of the conductive film formed by coating a film with the solution alone or as a coating material and drying the film was also excellent. In regard to the above-described mass ratio range, the storage stability was likely to be excellent as the mass ratio of the polyanion was higher.

Meanwhile, in each of the amine adducts of Comparative Examples 1, 2, and 7 in which the mass ratio of the polyanion was low, the storage stability when the amine adduct was formed into a solution was insufficient and a large amount of foreign matter was precipitated. The component of this foreign matter was unclear, but there is a possibility that the component was formed from re-precipitation of a part of the amine adduct. Further, it is considered that the mass ratio of the polyanion may be problematic because the value was extremely low regardless of the type of solvent forming the solution.

Further, in each of the amine adducts of Comparative Examples 3, 4, and 8 in which the mass ratio of the polyanion was extremely high, the storage stability when the amine adduct was formed into a solution was insufficient and the entire solution was gelled. The mechanism of this gelation was unclear, but it is considered that the mass ratio of the polyanion may be problematic because the value was extremely high regardless of the type of solvent forming the solution.

Further, in Comparative Example 5 in which the mass of the polyanion was low and Comparative Example 6 in which the mass of the polyanion was extremely high, the tributylamine adduct itself exhibited physical properties which were difficult to handle.

As described above, it is evident that the amine adduct of the conductive composite obtained by the production method of the present invention has excellent storage stability in a case where the amine adduct is formed into a solution and exhibits excellent conductivity as a conductive film.

[Industrial Applicability]

According to the present invention, it is possible to provide a method of producing an amine adduct of a conductive composite that exhibits excellent storage stability. Further, according to the present invention, it is possible to easily form a conductive layer having excellent adhesiveness and conductivity since an amine adduct liquid with less precipitate is used and to provide a method of producing a conductive film which is capable of reducing the time for the drying step since the dispersion medium of the amine adduct liquid is an organic solvent.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of producing an amine adduct of a conductive composite, comprising:
   precipitating the amine adduct of the conductive composite containing poly(3,4-ethylenedioxythiophene) polystyrene sulfonic acid by adding an amine compound and a first organic solvent to a conductive polymer dispersion liquid containing water and the conductive composite, the conductive composite having a mass ratio of the poly(3,4-ethylenedioxythiophene) to the polystyrene sulfonic acid of 1:3.0 to 1:7.5, and
   separating an excess polystyrene sulfonic acid which does not form the conductive composite from the precipitated amine adduct and collecting the precipitated amine adduct by filtration.

2. The method of producing an amine adduct of a conductive composite according to claim 1, further comprising:
   washing the collected amine adduct with a second organic solvent.

3. The method of producing an amine adduct of a conductive composite according to claim 1,
   wherein the first organic solvent added to the conductive polymer dispersion liquid is isopropanol.

4. The method of producing an amine adduct of a conductive composite according to claim 2,
   wherein the second organic solvent for washing the amine adduct is acetone.

5. The method of producing an amine adduct of a conductive composite according to claim 1,
   wherein the amine compound is trioctylamine or tributylamine.

6. A method of producing an amine adduct liquid of a conductive composite comprising:
   obtaining an amine adduct of the conductive composite according to the production method according to claim 1; and
   dissolving or dispersing the amine adduct of the conductive composite in third organic solvent.

7. The method of producing an amine adduct liquid of a conductive composite according to claim 6,
wherein the third organic solvent is isopropanol or methyl ethyl ketone.

8. The method of producing an amine adduct liquid of a conductive composite according to claim 6, further comprising:
adding a binder component.

9. The method of producing an amine adduct liquid of a conductive composite according to claim 8,
wherein the binder component has active energy ray curability.

10. A method of producing a conductive film, comprising:
a step of obtaining an amine adduct liquid of the conductive composite according to the production method according to claim 6;
a coating step of coating at least one surface of a base film with the amine adduct liquid of the conductive composite; and
a drying step of drying the applied amine adduct liquid.

11. The method of producing a conductive film according to claim 10,
wherein the amine adduct liquid contains a binder component having active energy ray curability, and
the method further comprises an active energy ray irradiating step of irradiating a coated film of the dried amine adduct liquid with active energy rays after the drying step.

12. The method of producing an amine adduct of a conductive composite according to claim 1, comprising adding the first organic solvent to the conductive polymer dispersion liquid after adding the amine compound.

13. The method of producing an amine adduct of a conductive composite according to claim 1, comprising adding the first organic solvent to the conductive polymer dispersion liquid before adding the amine compound.

14. The method of producing an amine adduct of a conductive composite according to claim 1, comprising combining the first organic solvent and the amine compound to form a mixed solution and adding the mixed solution to the conductive polymer dispersion liquid.

15. The method of producing an amine adduct of a conductive composite according to claim 1, wherein the first organic solvent includes isopropanol and the amine compound is at least one of tributylamine and trioctylamine.

16. A method of producing an amine adduct of a conductive composite, comprising:
precipitating the amine adduct of the conductive composite containing a π conjugated conductive polymer and a polyanion by adding an amine compound and a first organic solvent to a conductive polymer dispersion liquid containing water and the conductive composite, the conductive composite having a mass ratio of the π conjugated conductive polymer to the polyanion of 1:3.0 to 1:7.5,
separating an excess polyanion which does not form the conductive composite from the precipitated amine adduct by filtration; and
collecting the precipitated amine adduct.

17. The method of producing an amine adduct of a conductive composite according to claim 16, wherein the π conjugated conductive polymer is poly(3,4-ethylenedioxythiophene).

18. The method of producing an amine adduct of a conductive composite according to claim 16, wherein the polyanion is polystyrene sulfonic acid.

19. The method of producing an amine adduct of a conductive composite according to claim 16, comprising adding the first organic solvent to the conductive polymer dispersion liquid after adding the amine compound.

20. The method of producing an amine adduct of a conductive composite according to claim 16, comprising adding the first organic solvent to the conductive polymer dispersion liquid before adding the amine compound.

21. The method of producing an amine adduct of a conductive composite according to claim 16, comprising combining the first organic solvent and the amine compound to form a mixed solution and adding the mixed solution to the conductive polymer dispersion liquid.

22. The method of producing an amine adduct of a conductive composite according to claim 16, wherein the first organic solvent includes isopropanol.

23. The method of producing an amine adduct of a conductive composite according to claim 16, wherein the first organic solvent includes isopropanol and the amine compound is at least one of tributylamine and trioctylamine.

* * * * *